United States Patent [19]

Dressler

[11] Patent Number: 5,236,752
[45] Date of Patent: Aug. 17, 1993

[54] WEB FOR MAKING A MULTI-COLORED SIGN

[76] Inventor: Donald R. Dressler, 22 Colony Cir., Glastonbury, Conn. 06033

[21] Appl. No.: 762,546

[22] Filed: Sep. 18, 1991

Related U.S. Application Data

[62] Division of Ser. No. 472,840, Jan. 31, 1990, Pat. No. 5,073,424.

[51] Int. Cl.$^5$ .............................................. B32B 7/06
[52] U.S. Cl. .......................................... 428/41; 428/42; 428/43; 428/131; 428/132; 428/137; 428/140; 428/172; 428/192; 428/220; 428/332; 428/480; 428/483; 428/500; 428/914
[58] Field of Search ..................... 428/41, 42, 43, 131, 428/132, 137, 140, 172, 192, 480, 483, 500, 914, 220, 332

[56] References Cited

U.S. PATENT DOCUMENTS

| | | | |
|---|---|---|---|
| 4,423,106 | 12/1983 | Mahn | 428/207 |
| 4,467,525 | 8/1984 | Logan et al. | 33/18 B |
| 4,512,839 | 4/1985 | Gerber | 156/248 |
| 4,560,600 | 12/1985 | Yellin et al. | 428/43 |
| 4,834,276 | 5/1989 | Logan | 226/76 |
| 4,855,171 | 8/1989 | McKie et al. | 428/40 |
| 4,895,746 | 1/1990 | Mertens | 428/40 |
| 5,026,584 | 6/1991 | Logan | 428/41 |

Primary Examiner—Paul J. Thibodeau
Assistant Examiner—D. S. Nakarani
Attorney, Agent, or Firm—Chilton, Alix & Van Kirk

[57] ABSTRACT

The web is a substantially flat laminate in the form of a base sheet having a permanent upper surface of plastic material defining a base color, which may optionally be clear. A final graphics layer covers the base sheet and has an upper surface colored differently from the base color and a lower surface adhering to the upper surface of the base. The peel values of the upper and lower surfaces of the layer relative to each other and to the upper surface of the base are such that the cut graphic pattern in the layer remains secured to the base while the other portions of the layer may readily be peeled from the base without excessively adhering to and thereby removing the graphic pattern from the base. Preferably, two or three differently colored layers are laminated with the base, to permit the making of a sign having two or three different colors in addition to the colored (or clear) base. An important characteristic of the colored layers is the peel values between the upper and lower surfaces of the adjacent, laminated layers in the web, and among the upper and lower surfaces of all layers during weeding of the unwanted portions of the layers after the graphic pattern has been cut.

19 Claims, 7 Drawing Sheets

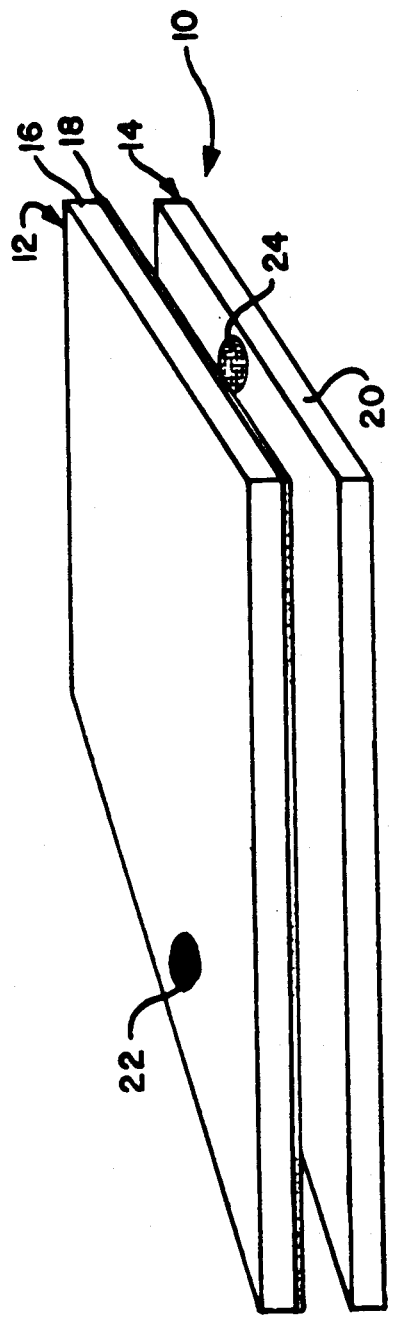
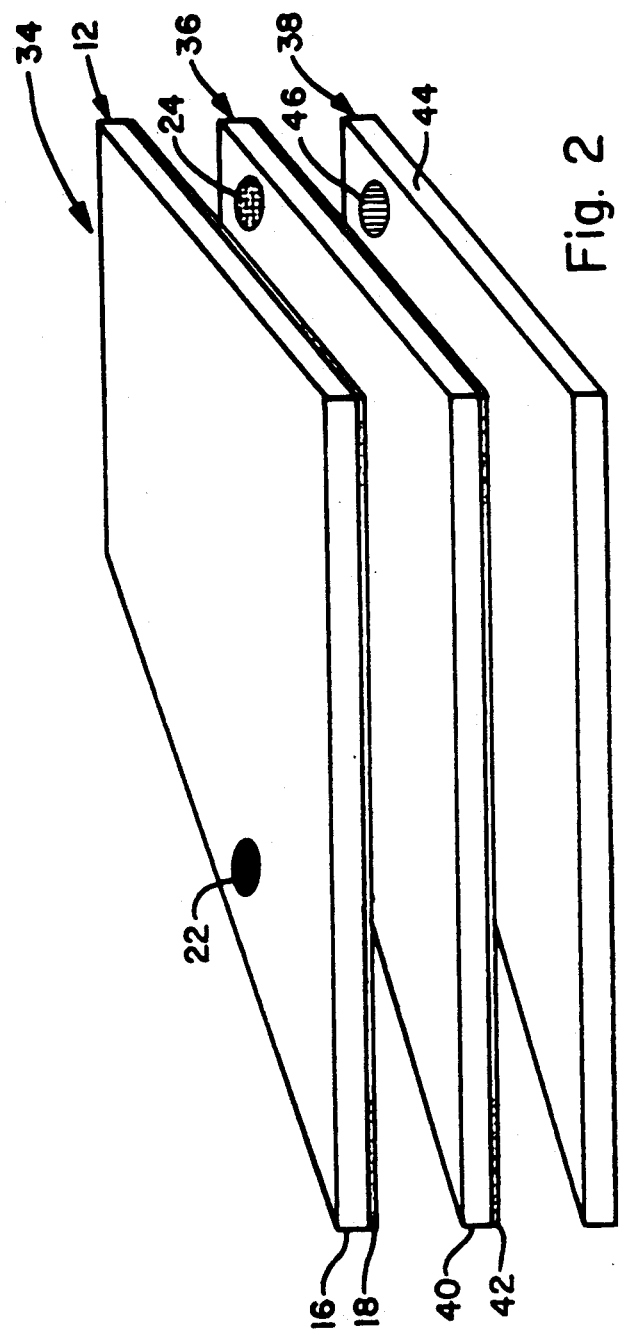

WEB FOR MAKING A MULTI-COLORED SIGN

This is a divisional of copending application Ser. No. 472,840 filed Jan. 31, 1990 now U.S. Pat. No. 5,073,424."

BACKGROUND OF THE INVENTION

The present invention relates to the making of signs or displays from a laminated web.

U.S. Pat. No. 4,467,525 issued on Aug. 28, 1984, and U.S. Pat. No. 4,834,276 issued on May 30, 1989 to Gerber Scientific products, Inc., Manchester, Conn. describe equipment and material for making a sign or display from a laminated web. The disclosed process includes the cutting of a graphic pattern in the web as a first step toward making a sign. In the making of such signs, letters or other graphic patterns are cut in the web, the patterns are then lifted from the web and secured to a permanent substrate, such as the side of a vehicle or truck body, a window, or similar surface.

In known techniques, the web typically consists of a coated release paper to which a single vinyl film of one color has been laminated. This lamination is typically achieved by means of a pressure sensitive adhesive at the interface of the polyvinyl film and release paper. A graphic pattern is cut in the vinyl film, and the portion of the vinyl layer other than the desired graphic pattern is then lifted from the base manually with a tweezers and discarded, thereby leaving only the desired graphics pattern on the base. The adhesive remains on the underside of the lifted vinyl. The remaining graphics are then transferred to another substrate via "transfer tape".

This process is very time consuming because the following steps must be taken:

1. All unwanted portions of the vinyl layer on the web must be carefully "weeded" away from the release liner with extreme care because they carry a very aggressive pressure sensitive adhesive which will destroy and remove desired portions of the graphic pattern if contact is made between the top surface of the graphic pattern and the bottom surface of the unwanted portions of the web during their removal.

2. After successfully weeding unwanted portions of the vinyl layer from the release liner of the web, the sign maker carefully laminates a pressure sensitive transfer tape on top of the weeded web. The tape with exposed adhesive against the web, is rubbed down with considerable pressure to ensure intimate contact with the graphics on the web.

3. The release liner of the web is peeled away from the transfer tape, leaving the remaining portion of the web (the graphic pattern) attached to the adhesive side of the transfer tape.

4. The transfer tape with attached graphic is then laminated to a final substrate by considerable rubbing on top of the tape surface to ensure intimate contact between the final substrate and pressure sensitive adhesive on the backside of the graphic.

5. The transfer tape is peeled off leaving the desired graphic pattern on the final substrate, thereby completing the sign.

U.S. Pat. No. 4,512,839 discloses a web and related process for making a multicolor sign, but the process as disclosed therein has many of the same complexities and inconveniences described immediately above. In particular, the process relies on cutting the web to varying depths, and peeling away the base to expose an adhesive for transferring the desired graphic pattern to a final substrate to complete the sign.

U.S. Pat. No. 4,855,171 discloses another sign-making web which has multiple film layers and is usable with cutting machines such as the type available from Gerber Scientific Products. This web is used to make subsurface signs, in which the desired graphic pattern is not transferred to a separate substrate. However, the web is adapted for, and the process requires, the removal of the base of the web and the securement of a transparent or translucent superstratum sheet on top of the cut graphics to produce the final sign.

Some types of signs that do not require transfer have been commercially available for limited markets. Such signs are in the nature of banners, wherein the web release liner serves as the background of the banner, and the cut graphic remaining in the vinyl layer after weeding provides the desired graphic pattern. Such signs invariably have only one color for the graphic pattern. As in the conventional signs described above, the base layer of the web is a coated release paper. In general, use of the peeled web as a final sign is limited to circumstances where low cost is necessary and low quality if acceptable. The release coated paper tends to curl and wrinkle due to moisture and temperature variations, and is otherwise not pleasing in appearance. Moreover, conventional webs have feed holes along their longitudinal edges which render any sign made from the web itself quite unsightly. The holes should be removed by cutting longitudinally adjacent the edges of the web, which is very time-consuming and is not likely to lead to clean, straight edges.

It is possible that the objective of making quality signs at relatively low cost without transferring a graphic pattern from one substrate to another, might in the past have been considered or discussed by suppliers of sign web material. To the inventor's knowledge, however, no one else has yet discovered a viable technique for making a signal having two or more colors on a base color, without transfer. Nor, to the inventor's knowledge, has anyone else attempted to use a web having a plastic or plastic-lined material for the base of the web, which remains as a visible color of the final sign. Furthermore, no one else has suggested a technique for making a layered film sign without transfer, which also has an optically clear base.

Thus, although computerization has greatly increased the speed with which complex graphics patterns can be cut on a web, the efficiency of the subsequent steps of using the cut web to make a final signal have not been improved upon for many years.

SUMMARY OF THE INVENTION

It is, accordingly, an object of the present invention to provide a web which itself can be easily transformed into an attractive, quality signal without the need to transfer the graphic pattern to a separate substrate, peel away the base of the web, or cover the pattern with a superstratum.

It is a another object that such web be transformable into a multi-color sign having at least two colors in addition to the background color.

It is a further object of the invention to provide a non-transferred, multicolor signal which as a durable backing that has high tensile strength and is resistant to curling, wrinkles, and shrinkage.

It is another object to provide the option in a multi-color sign, of a backing having optical clarity so that when the sign is applied to a window, observers can see through the window in both directions between the characters of the graphic pattern.

In a straightforward embodiment of the invention, the web is a substantially flat laminate in the form of a base sheet having a permanent upper surface of plastic material defining an opaque base color, which may optionally be clear. A final graphics layer covers the base sheet and has an upper surface colored differently from the base color and a lower surface adhering to the upper surface of the base. The peel values of the upper and lower surfaces of the layer relative to each other and to the upper surface of the base are such that the cut graphic pattern in the layer remains secured to the base while the other portions of the layer may readily be peeled from the base without excessively adhering to and thereby removing the graphic pattern from the base.

In the preferred embodiment, the web has a durable, cut-resistant base that is not coated with a release material. Rather, the underside of the layer that is laminated to the base has a relatively high peel value for removal from the base, either due to an adhesive coating or the inherent surface properties of the layer. This layer can, for example, be either an adhesive coated polyethylene film, or an uncoated polypropylene film.

Preferably, two or three differently colored layers are laminated with the base, to permit the making of a sign having two or three different colors in addition to the colored (or clear) base. An important characteristic of the colored layers is the peel values between the upper and lower surfaces of the adjacent, laminated layers in the web, and among the upper and lower surfaces of all layers during weeding of the unwanted portions of the layers after the graphic pattern has been cut. For a given web cut pattern, portions of each layer are selectively peeled away, revealing the color on the upper surface of the next lower layer, thereby affording the sign maker great flexibility in the colorization of a particular graphic pattern.

Thus, in accordance with the present invention, a sign maker utilizes a new web with conventional web cutting equipment. With a minimal effort in manual labor, he or she can readily selectively peel away bands in the cut pattern to transform the web itself into a high-quality, multi-color sign. A sign made in accordance with the invention is, in effect, made in only one step, rather than the multiple steps associated with conventional sign making techniques.

A further feature of the invention is providing the web with perforated feeder strips along the longitudinal edges, whereby the unsightly feed holes can easily be removed merely by pulling the feed strips away from the web to expose clean edges on the base of the final sign.

BRIEF DESCRIPTION OF THE DRAWINGS

These and other objects and advantages of the invention will become apparent from the following description of the preferred embodiments made with reference to the accompanying drawings, in which:

FIG. 1 is a schematic view of the sign web construction in the simplest embodiment of the invention;

FIG. 2 is a schematic of the web construction in accordance with a second embodiment of the invention;

DESCRIPTION OF THE PREFERRED EMBODIMENT

Figure 3:
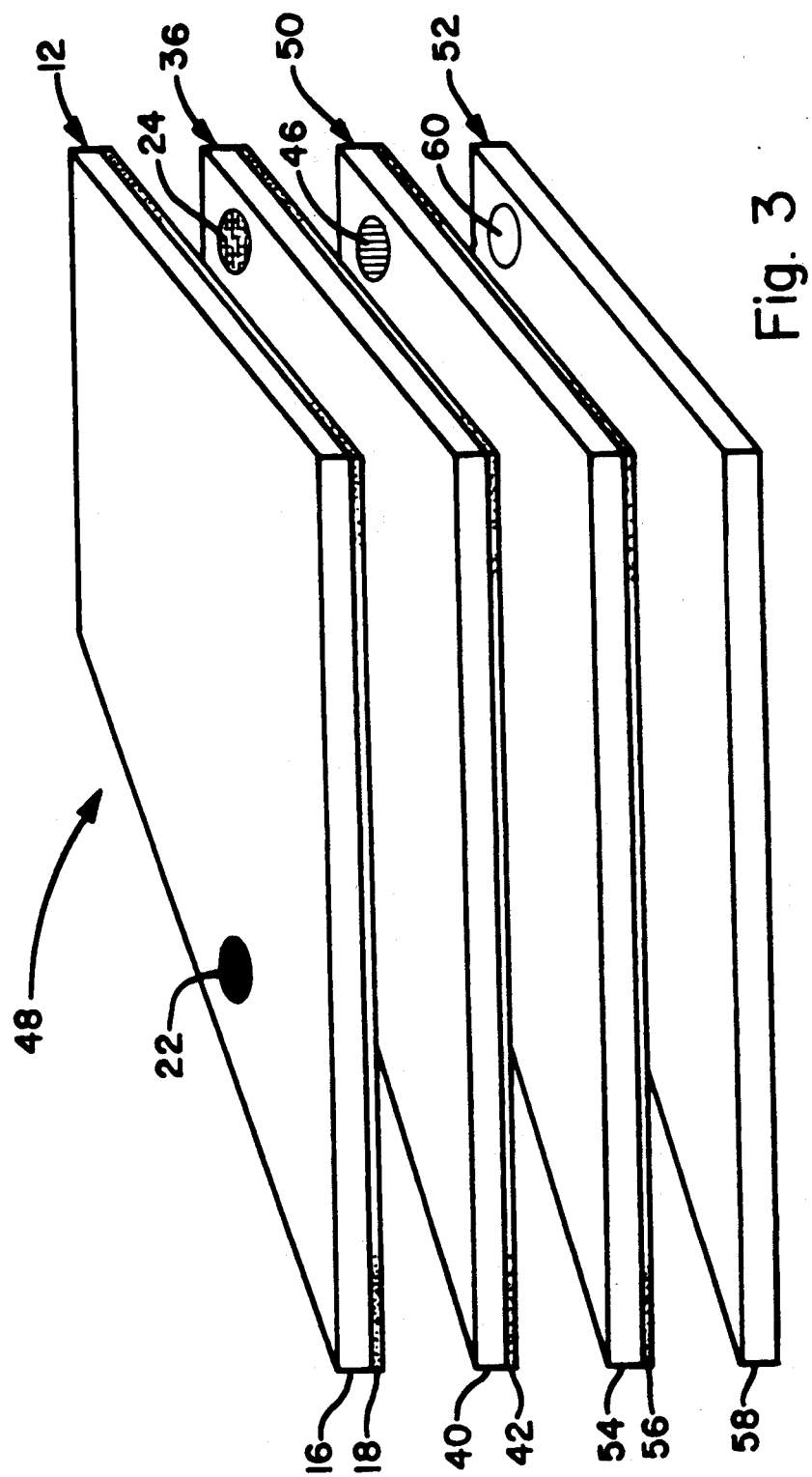
FIG. 3 is a schematic or the web construction in accordance with the preferred embodiment of the invention.

FIG. 1 shows the basic components of a sign web 10 according to the invention, including a single graphics layer 12 covering a base 14, the layer and base normally being laminated together in an elongated roll, but shown in FIG. 1 as separate components for clarity of description. In the illustrated embodiment, the upper layer 12 is a composite of a colored film 16 having good release properties, such as polyethylene, and an undercoating 18 of pressure sensitive adhesive. The upper surface 22 of layer 12 has properties of color and texture suitable for sign graphics. In this and the other embodiments to be described below, the top layer 12 has the color black, to be indicated throughout the figures by the same color code.

The base 14 is an untreated sheet 20 of a material selected from the group consisting of polyester, nylon, acetate, acrylic, or equivalents, and is preferably polyester because this material has good dimensional stability, rigidity, and tensile strength, and is available in a form having optical clarity. In FIG. 1, the upper surface of base 14 is shown with hatching 24 indicating the color yellow, this hatching representing yellow throughout the figures. The surface 24 has properties of color and texture suitable for a quality sign. It should be appreciated, however, that the base 14 is preferably clear polyester, for reasons to be discussed more fully below.

Figure 4:
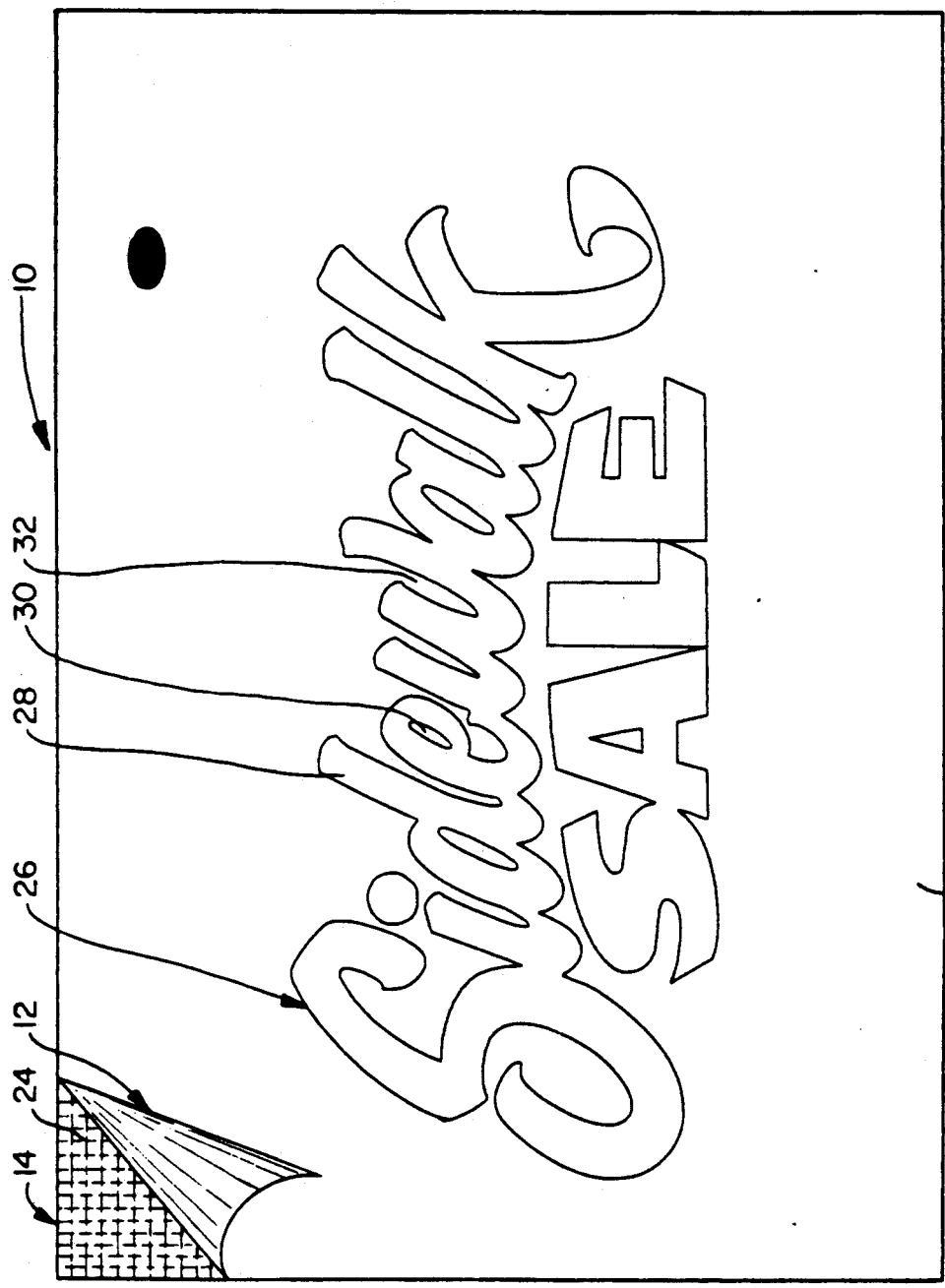
FIG. 4 is a schematic illustration of one step associated with making a sign using the embodiment of the web shown in FIG. 1.

The web of FIG. 1 is employed with a conventional sign or graphics cutting tool, such as described in U.S. Pat. Nos. 4,834,276 and 4,467,525, the disclosures of which are hereby incorporated by reference. The tool is programmable to produce a wide variety of sign or other graphics including letters, symbols, or designs, of virtually any size or orientation. FIG. 4 is a schematic representation of the web 10 of FIG. 1 with a graphic pattern 26 cut therein by a blade controlled by the tool (not shown). The blade cuts the pattern through layer 12, without cutting through base 14. Such blade control is conventional and does not form a part of the present invention. The lettering 26 in FIG. 4 can be characterized as having a single band, i.e., each desired letter or similar design has a single band width to be displayed in a single color, such as the region 28 shown in the script letter "d".

Unlike the conventional manner of fabricating signs, the present invention does not require the transfer of the graphic pattern from the web to a separate sign substrate. Thus, the base layer 14 provides the substrate in the finished sign. To convert the cut web 10 of FIG. 4 into a finished sign, the black layer 12 is peeled, preferably starting in the upper left corner as shown. This exposes the yellow surface 24 of the base, except within the bands of the graphics layer 12 defined within the cuts, such as the letters 28. It should be appreciated that, conventionally, the removal of a layer such as 12 poses great difficulty especially for the removal of islands 30 or narrow, finger-like regions 32. Stripping off virtually all of the unwanted portion of layer 12 in one substantially continuous pulling action, while leaving the graphics bands 26 intact on the web, would be nearly impossible with conventional vinyl layers, because the upper and lower surfaces of vinyl material do not have inherent release characteristics. The peeled portions would stick to each other and stick to the cut bands 28, tending to lift them or buckle them on the web. This is why, conventionally, the undesired graphics 26 are removed carefully with tweezers from the web.

In contrast, with the present invention removal of the layer 12 while the graphics bands 26 remain on base 14, is achieved quickly, and in essentially one step, to produce a vivid sign having, for example, a yellow background 24 and a black graphic pattern 26 thereon. A pointed, angled tool, such as a dentist's pick, is preferably used to pull up one corner of the layer initially, whereby with the large unwanted regions can be peeled off in one pull. The pick is then used to pull off any remaining small regions of the layer, such as the islands 30.

An important characteristic of the invention is the use of a layer 12 that has release properties, at least on the upper surface 22, so that neither the upper surface 22 nor the adhesive lower surface 18 of the layer 12, pulls the graphics bands 28 from the base 14 as the layer 12 is peeled off substantially continuously from the base. No covering is employed, so the upper surface 22 is not adapted to adhere to a superstratum. In the embodiment described with respect to FIG. 1, the layer 12 is made of polyethylene which has such good release properties that an adhesive is required to laminate the layer 12 onto the base when the web 10 is initially formed. An alternative material for the layer 12 is uncoated polypropylene, which does not release quite as easily as polyethylene, but which nevertheless has sufficiently good release qualities to avoid detaching the cut bands 28 as the layer 12 is peeled, while adhering sufficiently to base 14 to permit the cutting and retention of the sign graphics 26 and the peeling of the rest of the layer 12 from the base.

In this context, the term "peel value" may usefully be employed to describe the force necessary to pull one film material away from another film material with which it is in contact. Peel value is thus an emperical relationship between two films in the context of a sign making process, rather than a laboratory measurement made under standardized conditions.

According to the invention, it is desired that the peel value between any given portion of the upper surface 22 of layer 12 and any other portion of this upper surface, and between the lower surface of layer 12 and the upper surface 22, be less than the peel value between the lower surface of layer 12 as laminated to the upper surface of base 14. As used herein, "laminated" should be understood to mean the augmented surface to surface contact between films. Augmented contact can include the effects of pressure applied manually or by machine, heat, chemical reaction, or similar deliberate processing. Lamination in the present context is to be distinguished from casual contact, during which the films are in substantially pressureless contact for a brief period of time at ambient temperature.

One variable for optimizing the relative peel values of the films used in the present invention, is the choice of adhesive for the coating 18 on the underside of the film 16 shown in FIG. 1. If this coating 18 is chosen as a pressure sensitive adhesive, the adhesion to the base surface 24 is initially quite strong due to the pressure that Was applied as the layer 12 and base 14 were laminated together during fabrication of the web 10. This strong adhesion remains even after the graphics bands 26 are cut in the web. The adhesion should not be so strong, however, to unreasonably restrict the ability for a typical adult to peel layer 12 as shown in FIG. 4. Once the pressure sensitive coating of layer 12 has been first released from the base 14, its peel value with respect to all film surfaces is considerably reduced. Therefore even if the adhesive coating 18 contacts the graphics bands 26 during the peeling of layer 12, the graphics bands, which continue to adhere to the base with a peel value corresponding to the laminated condition, will not be pulled off the web or distorted.

It should be appreciated that a sign made in accordance with the present invention has the graphic pattern 26 visible against the base sheet 14. In a particularly desirable embodiment of the invention, the base 14 is made from clear polyester so that the sign may be hung in a store front window or the like, whereby passersby can see through the backing or base 14 in the area such as at 32 immediately surrounding and between the individual letters or characters of the graphic pattern 26. This also minimizes the blockage of natural light entering the store through the window. Similarly, persons in the store can clearly see outside. These features not only give the sign a higher quality, "painted on glass" appearance, but also enable the potential shopper to see a greater area of display merchandise or activity in the store behind the sign.

It should also be appreciated that other materials may be used without departing from the scope of the invention. In general, materials for layer 12 should not be brittle or tear easily, or be sensitive to temperature variations. Although polyvinyl chloride (PVC) of the type conventionally used in sign making are not preferred materials, surface treatment such as providing a matte finish to reduce adhesion should improve usability. Similarly, polyester could be surface treated to perform satisfactorily as a colored layer as well as the base.

The base 14 need not normally have good release properties, but should have good dimension stability and, preferably, clarity and optical non-distortion. It should also be more resistant to cutting by the cutting tool that the layer 12. The most desirable material presently known to the inventor is clear polyester film having a thickness of at least 0.005 inch and preferably 0.007 inch. Polyester film of such thickness is very resistant to cutting by the tool. Complete cutting through the base is easily avoided with minimal care in the setting of the cutting tool pressure. Clear nylon, acetate PVC or acrylic material may also be usable for the base. Polypropylene or polycarbonate, as well as plastic coated paper may alternatively be used. In general, a non-paper, e.g., plastic base is preferred for most end uses, but a heavy paper base having a permanent plastic upper surface would be servicable for some end uses. In contrast to a conventional paper base, the base of the present invention is not release coated.

FIG. 2 shows another web embodiment 34 having a total of three components which are laminated together for use by the sign maker. In this embodiment, the lower layer 36 has an upper surface 24 indicated with the color yellow, and the base 38 is a polyester material 44 indicated as red at 46. The top layer 12 has a polyethylene film 16 providing a black top surface 22, and an undercoating 18 of pressure sensitive adhesive. The thickness of the polyethylene layer 16 is preferably about 0.003 inch, whereas the adhesive coating is preferably about 0.0005 inch thick. Layer 36 is similar to layer 12, although as discussed with respect to the embodiment of FIG. 1, the layer 36 next to base 38 could alternatively be a film of colored polypropylene without the adhesive coating.

It should be appreciated, based on the description of the simplest form of the invention with respect to FIG. 1, that the web of FIG. 2 permits the making of a sign having two colors in addition to the color of the base. For example, if the graphic cut pattern 26 of FIG. 4 were applied to the web of FIG. 2, the word "Sidewalk" could remain black, the word "SALE" appear in yellow, and the background appear in red. It should further be appreciated that, ultimately, the sign maker has great flexibility to coordinate interdependent variables. In the example of the web of FIG. 2, the variables of black, yellow, and red color are afforded by the different colors of the layers 12,36 and the base 38. Also, there are in effect three graphics bands available for peeling, i.e., the words "Sidewalk", "SALE", and the background, affording a total of six sign variations. As discussed above, the base color may alternatively be clear, rather than a true color.

FIG. 3 represents the preferred web embodiment 48, wherein the top layer 12 is similar to layer 12 shown in FIGS. 1 and 2, intermediate layer 36 is similar to layer 36 shown in FIG. 2, final layer 50 (first layer on the base) has a red color 46 and is either an adhesively coated 56 polyethylene film 54 or a single sheet of colored polypropylene (not shown). The base 52 is made from clear polyester 58. The surfaces 60,46,24, and 22, define four total "colors" that are available for the sign. Other materials for the base and the layers as described above, could alternatively be used.

Figure 5:
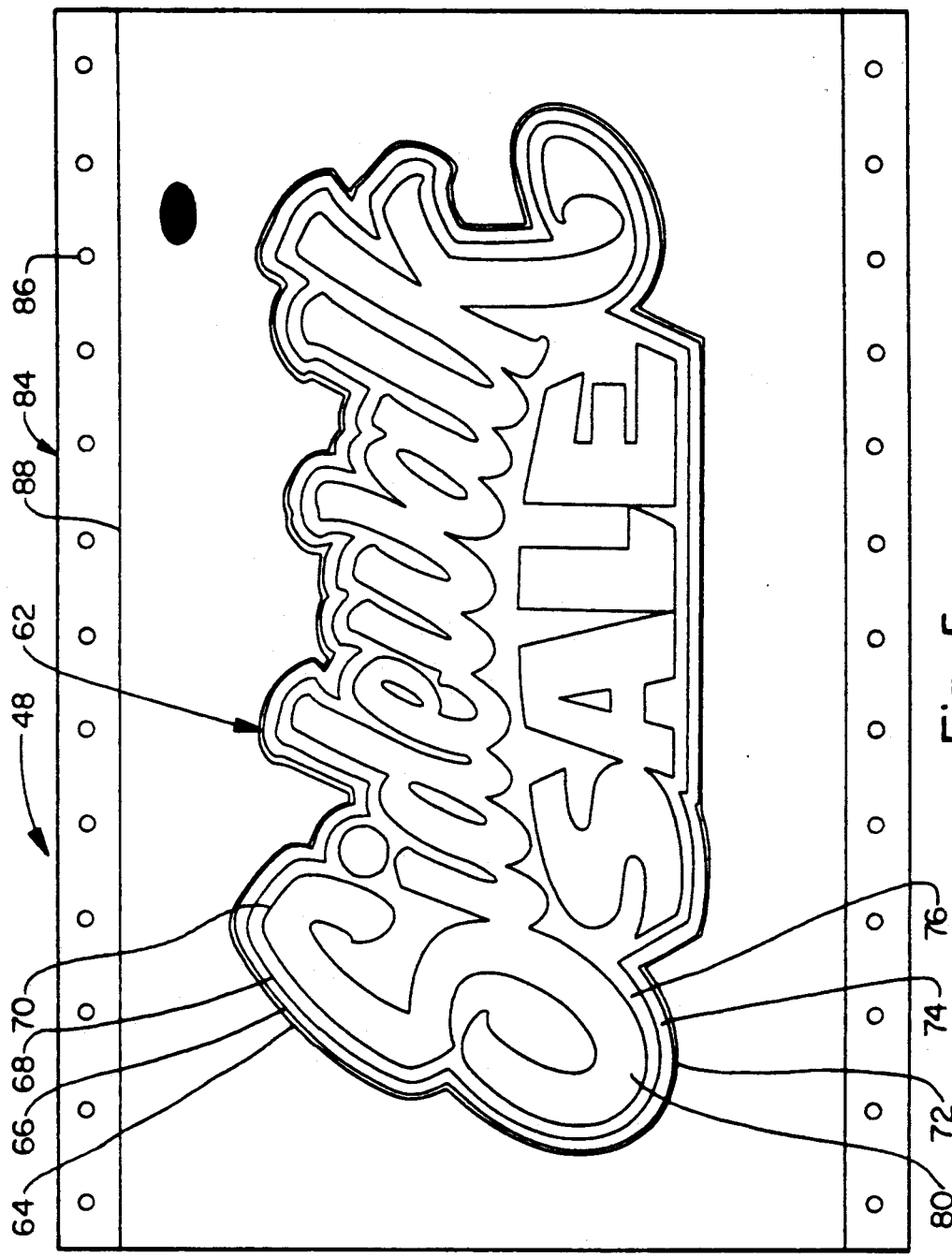
FIG. 5 is a schematic illustration of the preferred form of the web shown in FIG. 3, after a multi-band graphics pattern has been cut therein by a blade.

FIG. 5 shows the preferred implementation of the web 48 of FIG. 3, for making a three-color graphics sign carried by a clear, polyester base. The web 48 is preferably manufactured by lamination and rolled as one continuous sheet, which is then preferably converted to a form suitable for use in an automated graphics cutting tool of the type identified above. This conversion includes the forming of continuous feeder strips 84 along opposed longitudinal edges of the web. Each strip 84 includes a weakened, for example partially slit or perforated, line 88 and a series of spaced apart openings or holes 86 for engagement by sprocket pins (not shown) on the drive mechanisms of the cutting tool. The overall width of the web 48, strips 84, and the type and spacing of holes 86 may vary depending on the brand and size of the tool with which the web 48 is to be used. The perforations penetrate through all layers and the base, so that a clean edge remains on the web when the feeder strips are eventually pulled off the web at the perforations.

As the web 48 passes through the tool, a multi-band graphic pattern 62 is cut through the three layers 12, 36 and 50, without cutting through the base 52. It can be seen with respect to the letter "S" of the word "Sidewalk", that four cut lines 64, 66, 68 and 70, are associated with a given portion of the top of the letter. These cut lines define three bands 72, 74 and 76, apart from the innermost band 80 defining the letter itself. As used herein, the term "graphic band" is meant in the most general sense, as a region of any configuration, shape, or length, having a discernible width and bordered by a cut line.

Once the graphic pattern 62 has been cut, the web segment 48 cut transversely and removed from the machine, and the feed strip removed, the generally rectangular, cut web can be laid flat on a table for the subsequent steps of selectively peeling off the layers until the desired graphics bands form the multicolor sign pattern. The resulting clean lines permit two signs to be abutted easily side-by-side to form a composite sign in which all graphics will be neatly aligned.

Figure 6:
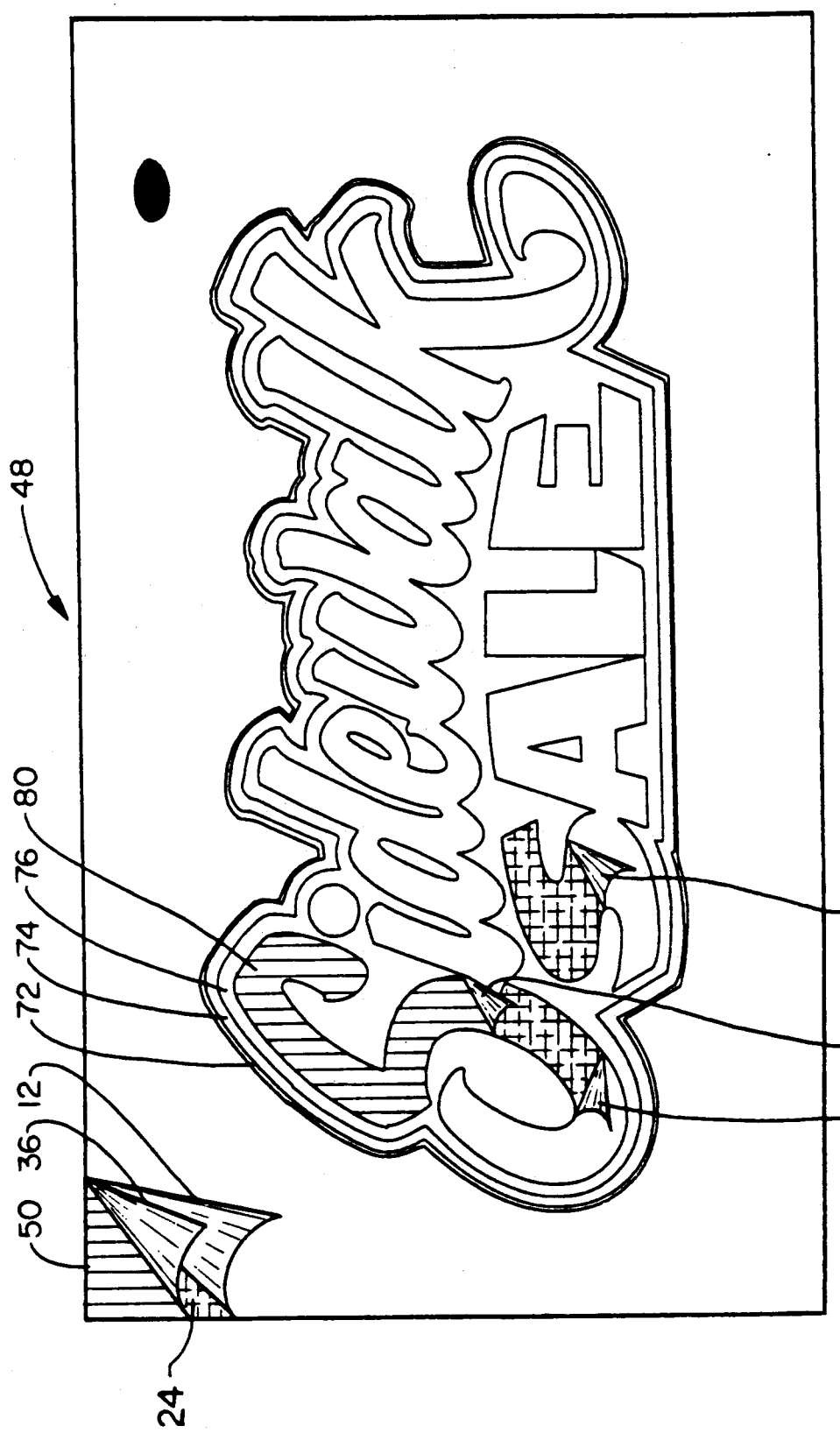
FIG. 6 is a schematic illustration of the web of FIG. 5, during an intermediate step in the making of a sign.

FIG. 6 is a schematic illustration of intermediate steps during peeling of the first and second, i.e., top and intermediate, layers 12 and 36. The first layer 12 is peeled except for the graphic band 72, leaving a black border around the entire graphic pattern. Although not shown, immediately after that step the black band 72 appears against a background of yellow, i.e., the upper surface 24 of next layer 36. This is indicated by the several peel folds 12 on the "S" 's of "Sidewalk" and "SALE".

Next, selected portions of the second layer 36 are peeled, exposing the upper surface 46 of the third, final layer 50 in the background. For example, the "S" of the word "Sidewalk" is shown with a further peel 36 to expose the red surface 24 of band 80.

Figure 7:
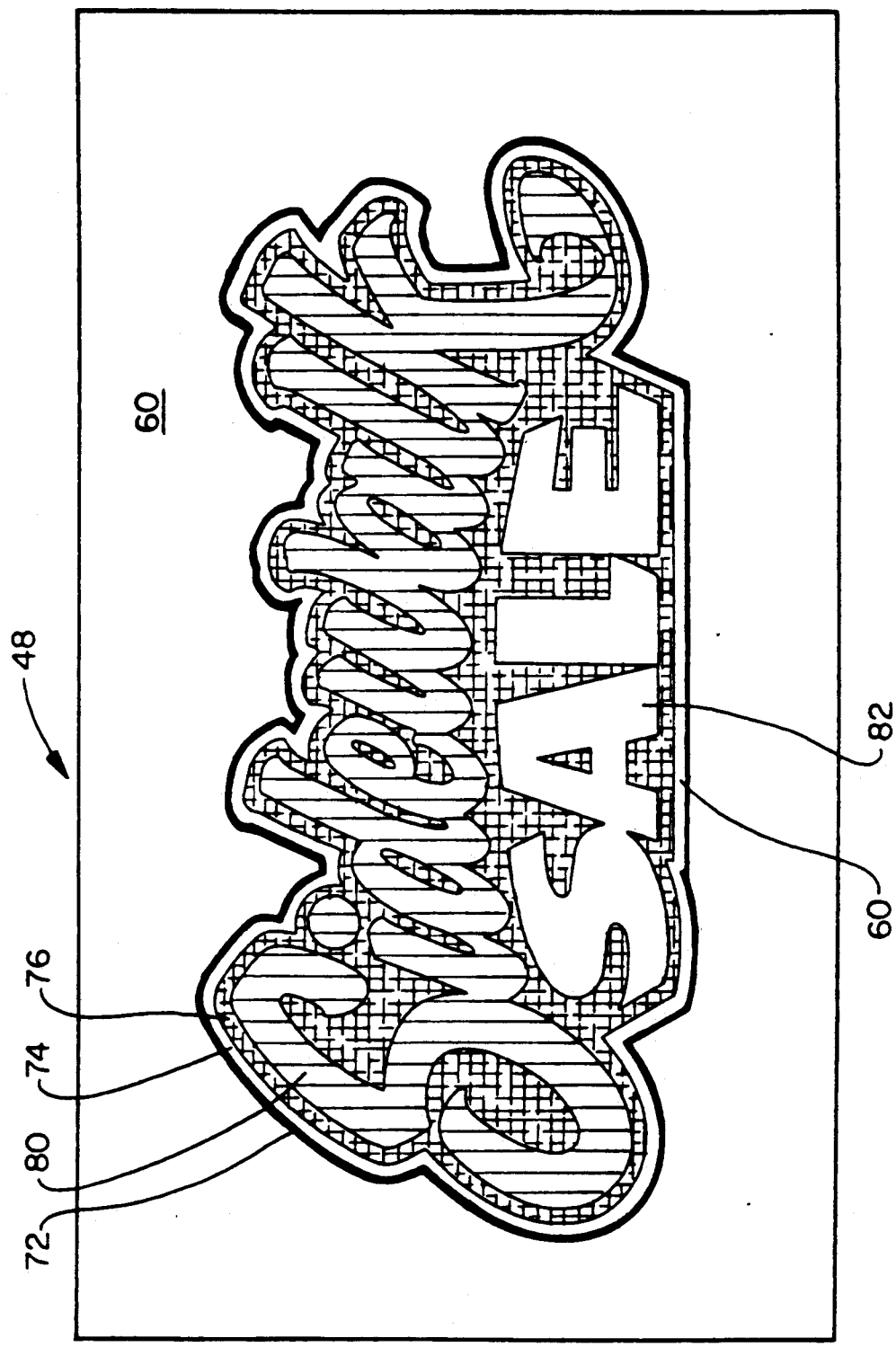
FIG. 7 is a schematic illustration of the completed sign after the step illustrated in FIG. 6.

FIG. 7 shows the completed sign, after the third peel by which the unwanted portions of the third, or red layer 50 have been peeled, exposing the clear (or alternatively white) color of the surface 60 of base 52. In the final sign, the graphics border band 72 is black, the next inner border band 74 is white or clear, the next inner band including the inner background of the graphics character as indicated at 76 is yellow, and the word "Sidewalk" is red as indicated at 80. In the illustrated sign, the word "SALE" 82 is the same color as the base 52, e.g., clear or white.

It can thus be appreciated that intricate graphics patterns having three colors in addition to the color of the base can be quickly formed without the step of transferring any portion of the sign from the cut web to either a permanent or temporary substrate. Moreover, several colors appear side-by-side in relatively narrow borders or bands, without the need for human placement, spacing, or adjustment and registration of one color band at a time. This represents a major savings in labor associated with the fabrication of affordable signs. The present invention enables the sign maker to fabricate signs of modest price having more complex, intricate, and vivid graphics than are otherwise possible even at a high price.

Figure 8:
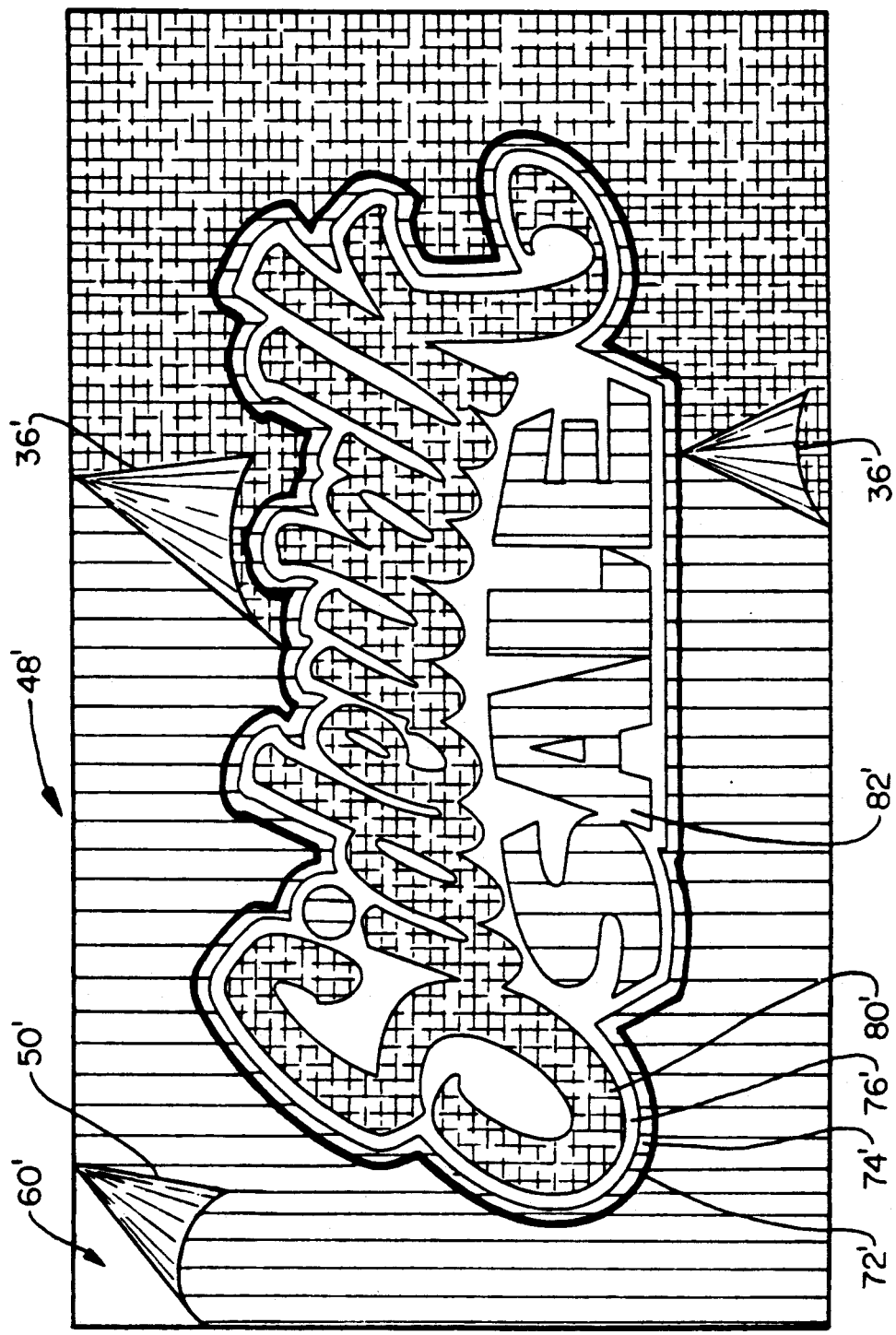
FIG. 8 is a schematic illustration of a different graphics color combination resulting from an alternative peeling sequence of the same web and multi-band cut pattern shown in FIG. 5.

FIG. 8 shows the advantage previously described with respect to the web embodiment of FIG. 2, regarding the many color combinations that are available at the sign maker's option, from a given initial web and cut pattern. For example, for the web embodiment of FIG. 3 and the cut pattern shown in FIG. 5, the graphics color scheme shown in FIG. 8 could be selected as an alternative to that shown in FIG. 7. In FIG. 8, the first, black layer 12 has been peeled so that, as in FIG. 6, border 72' is black. The subsequent peeling of yellow layer 36' and red layer 50' results in red border 74' and band 76'. The word "Sidewalk" 80 is yellow and the word "SALE" 82 red.

The present invention is likely to find significant use for what are known in the trade as "affordable signs", which are hung indoors for periods generally ranging from a few days to a few weeks. Use of the preferred clear polyester base material makes the inventive signs particularly suitable for hanging in store front windows. The polyester base is also strong enough to carry corner fixtures for suspending the sign in tension as a banner between poles or the like.

Although not all possible combinations of materials and peel values which will fall within the scope of the invention have as yet been identified by the inventor, the following relationships represent the inventor's best judgment of the salient features as of the filing data of the present application:

$$vx(bu/fl) > vx(fu/Ol) > vy(bu/fl), vy(bu/fu), vy(bu/ol),$$
$$vy(bu/ou), vy(fl/fu), vy(fl/ol),$$
$$vy(fl/ou) \ vy(fu/ol), vy(fu/ou),$$
$$vy(ol/ou) \ vy(fl/fl), vy(fu/fu),$$
$$vy(ol/ol) \ vy(ou/ou)$$

where,
- bu = base upper surface
- fu = first layer upper surface
- fl = first layer lower surface
- ou = other layer upper surface
- ol = other layer lower surface
- vx(si/sj) = peel value between surfaces si and sj during initial peeling of fabricated web
- vy(si/sj) = peel value between surfaces si and sj upon low pressure temporary constant subsequent to initial peeling of fabricated webs
- si/sj = any two surfaces bu, fu, fl, ou, or ol.

For the preferred embodiment having a colored base, a colored first layer, another colored layer, and a top colored layer, the relationship $$vs(bu/fl) > vx(fu/ol) > vx(ou/tl) > \text{all } vy(si/sj)$$

would hold true.

A significant feature of the invention is the plastic upper surface on the base, which serves the dual functions of contributing to the maximum peel value of the web, vs(bu/fl), while remaining permanently on the base to provide one of the available high quality colors (or clear background) for the sign graphics.

The components of the web are preferably obtained as conventional films and coatings, and are laminated together to form the web in a typical roll nip laminating process. Applicant believes, however, that although the individual components are conventional, the particular combination of the materials and their relative physical properties when laminated together as a web, constitute a new and significant improvement over known sign making webs.

I claim:

1. A substantially flat, rectangular web for making a sign having at least two colors, comprising:
   a base sheet having an upper surface and defining one of the sign colors;
   a graphics film layers covering the base sheet and having a graphics layer upper surface colored differently from the base sheet color and a graphics layer lower surface adhering to and peelable from the upper surface of the base sheet, the base sheet upper surface, graphics layers upper surface and graphics layer lower surface having respective peel values between each other, wherein the peel value between the graphics layer lower surface and the base sheet upper surface is greater than the peel value between the graphics layer lower surface and the graphics layer upper surface; and
   a pair of integrally formed feed strips defining the opposed longitudinal edges of the web, each strip having a separation line extending in parallel with the respective longitudinal edge whereby the strip can be selectively separated cleanly along the line from the remainder of the web.

2. A substantially flat, rectangular web for making a sign having at least two colors on a base color, comprising:
   a base sheet having an upper surface and defining one of the sign colors;
   a first graphics film layer covering the base sheet and having a first graphics layer upper surface colored differently from the base color and a first graphics layer lower surface adhering to and peelable from the upper surface of the base sheet,
   another graphics film layer covering the final graphics layer, the other graphics layer having an upper surface of different color than the colors of the base and first graphics layer and a lower surface adhering to and peelable from the upper surface of the first graphics layer;
   wherein the relative peel values of the layers and sheet are as shown in the following table:

$$vx(bu/fl) > vx(fu/O1) > vy(bu/fl), vy(bu/fu), vy(bu/ol),$$
$$vy(bu/ou), vy(fl/fu), vy(fl/ol),$$
$$vy(fl/ou) \ vy(fu/ol), vy(fu/ou),$$
$$vy(ol/ou) \ vy(fl/fl), vy(fu/fu),$$
$$vy(ol/ol) \ vy(ou/ou)$$

where,
- bu = base sheet upper surface
- fu = first layer upper surface
- fl = first layer lower surface
- ou = other layer upper surface
- ol = other layer lower surface vx(si/sj) = peel value between surfaces si and sj during initial peeling of fabricated web
- vy(si/sj) = peel value between surfaces si and sj upon low pressure temporary contact subsequent to initial peeling of fabricated web
- si/sj = any two surfaces bu, fu, fl, ou, or ol; and
   a pair of integrally formed feed strips defining the opposed longitudinal edges of the web, each strip having,
      a separation line extending in parallel with the respective longitudinal edge whereby the strip can be selectively separated cleanly along the line from the remainder of the web, and
      means between each edge and separation line, for engaging a web feed sprocket.

3. The web of claim 2, wherein the base color is optically clear.

4. The web of claim 1, wherein the web includes means between each edge and separation line, for engaging a web feed sprocket.

5. A web for making a sign without transfer, consisting essentially of:

an optically clear base sheet resistant to cutting by a blade; and an opaque graphics layer covering the base sheet, and releasably adhered thereto without an intervening layer of permanently tacky pressure sensitive adhesive, the graphics layer being relatively easily cut by a blade while adhered to the base sheet such that a graphics pattern can be cut through only the graphics layer of the web and after cutting, portions of the graphics layer can be peeled from, to expose portions of, the base sheet, while leaving the graphics pattern adhered to the base sheet.

6. The web of claim 5, wherein the graphics layer is made from a material selected from the group consisting of polyethylene, polypropylene, polyvinyl chloride, and polyester.

7. The web of claim 5, wherein the graphics layer is made from a material selected from the group consisting of polyethylene and polypropylene.

8. The web of claim 5, wherein the base sheet is a polyester film.

9. A web for making a two color sign, consisting essentially of:

a unitary base sheet including a plastic film that is relatively resistant to cutting by a blade, and material that is inseparable from the plastic film and which defines one opaque color available for the sign; and a differently colored graphics layer covering and releasably adhering to the base sheet, the graphics layer being relatively easily cut by a blade while adhered to the base sheet such that a graphics pattern can be cut through only the graphics layer of the web and, after cutting, portions of the graphic layer can be peeled from, to expose portions of, the base sheet, while leaving the graphics pattern adhered as another sign color to the base sheet.

10. The web of claim 9, wherein the graphics layer is made from a material selected from the group consisting of polyethylene, polypropylene, polyvinyl chloride, and polyester.

11. The web of claim 9, wherein the graphics layer is made from a material selected from the group consisting of polyethylene and polypropylene.

12. The web of claim 9, wherein the plastic film of the base sheet is made from a material selected from the group consisting of polyester, nylon, polyvinyl chloride, polycarbonate, and polypropylene.

13. The web of claim 9, wherein the plastic film has a thickness of at least about 0.005 inch.

14. The web of claim 13, wherein the plastic film is polyester.

15. The web of claim 1, wherein the base sheet includes a plastic film.

16. The web of claim 1, wherein the plastic film of the base sheet is polyester.

17. A web for making a two color sign, the web having length and width dimensions sized for the web to be fed longitudinally of itself in a sign cutting machine, comprising:

a base sheet including a plastic film that is relatively resistant to cutting by a blade, and material that defines one opaque color available for the sign;

a differently colored graphics layer covering and releasably adhering to the base sheet, the graphics layer being relatively easily cut by a blade while adhered to the base sheet such that a graphics pattern can be cut through only the graphics layer of the web and, after cutting, portions of the graphic layer can be peeled from, to expose portions of, the base sheet, while leaving the graphics pattern adhered as another sign color to the base sheet; and a pair of integrally formed feed strips defining the opposed longitudinal edges of the web, each strip having a perforated line extending in parallel with the respective longitudinal edge whereby the strip can be selectively separated cleanly along the line from the remainder of the web.

18. The web of claim 5, further including a pair of integrally formed feed strips defining the opposed longitudinal edges of the web, each strip having a perforated line extending in parallel with the respective longitudinal edge whereby the strip can be selectively separated cleanly along the line from the remainder of the web.

19. The web of claim 9, further including a pair of integrally formed feed strips defining the opposed longitudinal edges of the web, each strip having a perforated line extending in parallel with the respective longitudinal edge whereby the strip can be selectively separated cleanly along the line from the remainder of the web.

* * * * *

UNITED STATES PATENT AND TRADEMARK OFFICE
CERTIFICATE OF CORRECTION

PATENT NO. : 5,236,752
DATED : August 17, 1993
INVENTOR(S) : Donald R. Dressler

It is certified that error appears in the above-indentified patent and that said Letters Patent is hereby corrected as shown below:

Column 9, line 65, "layers" should be --layer--.

Column 10, line 2, "layers" should be --layer--.

Signed and Sealed this

Twenty-sixth Day of November 1996

Attest:

BRUCE LEHMAN

Attesting Officer     Commissioner of Patents and Trademarks